UNITED STATES PATENT OFFICE.

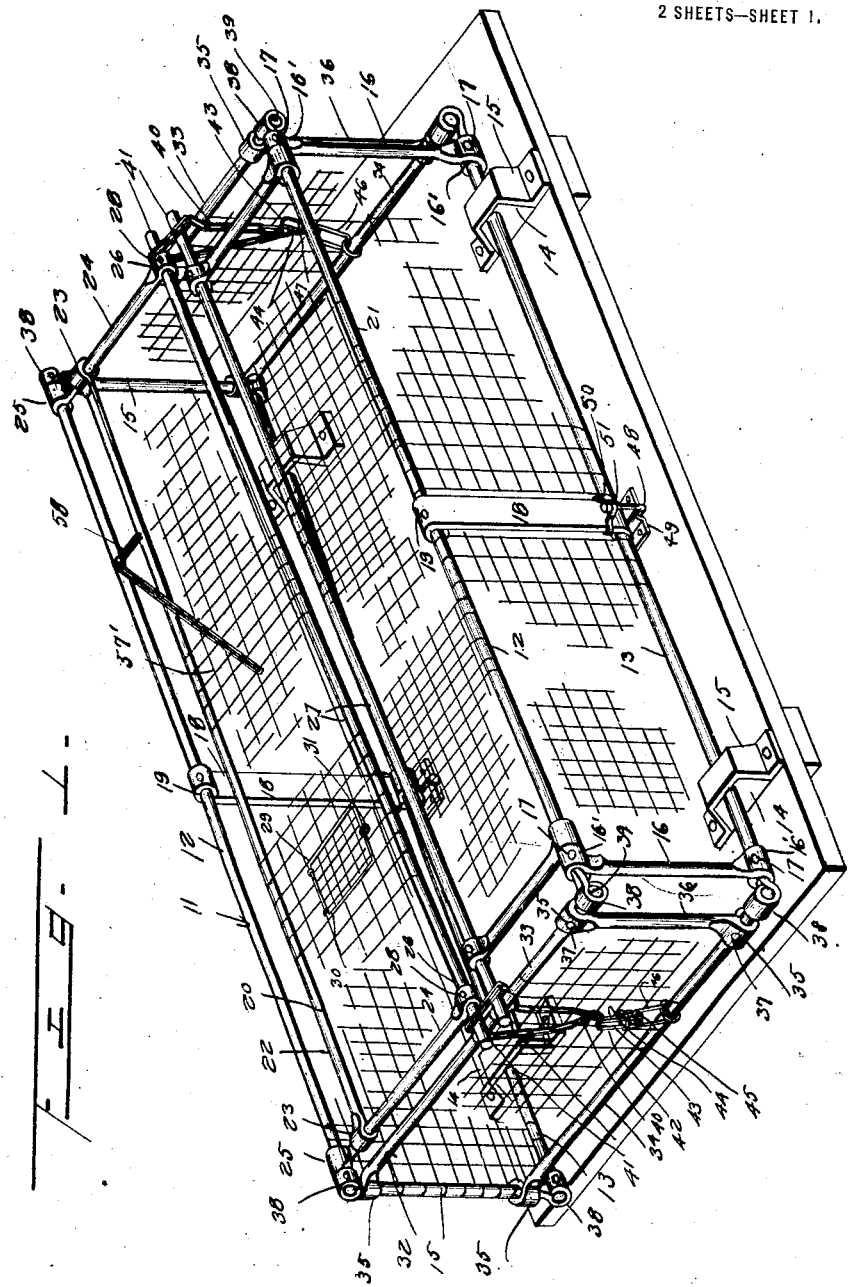

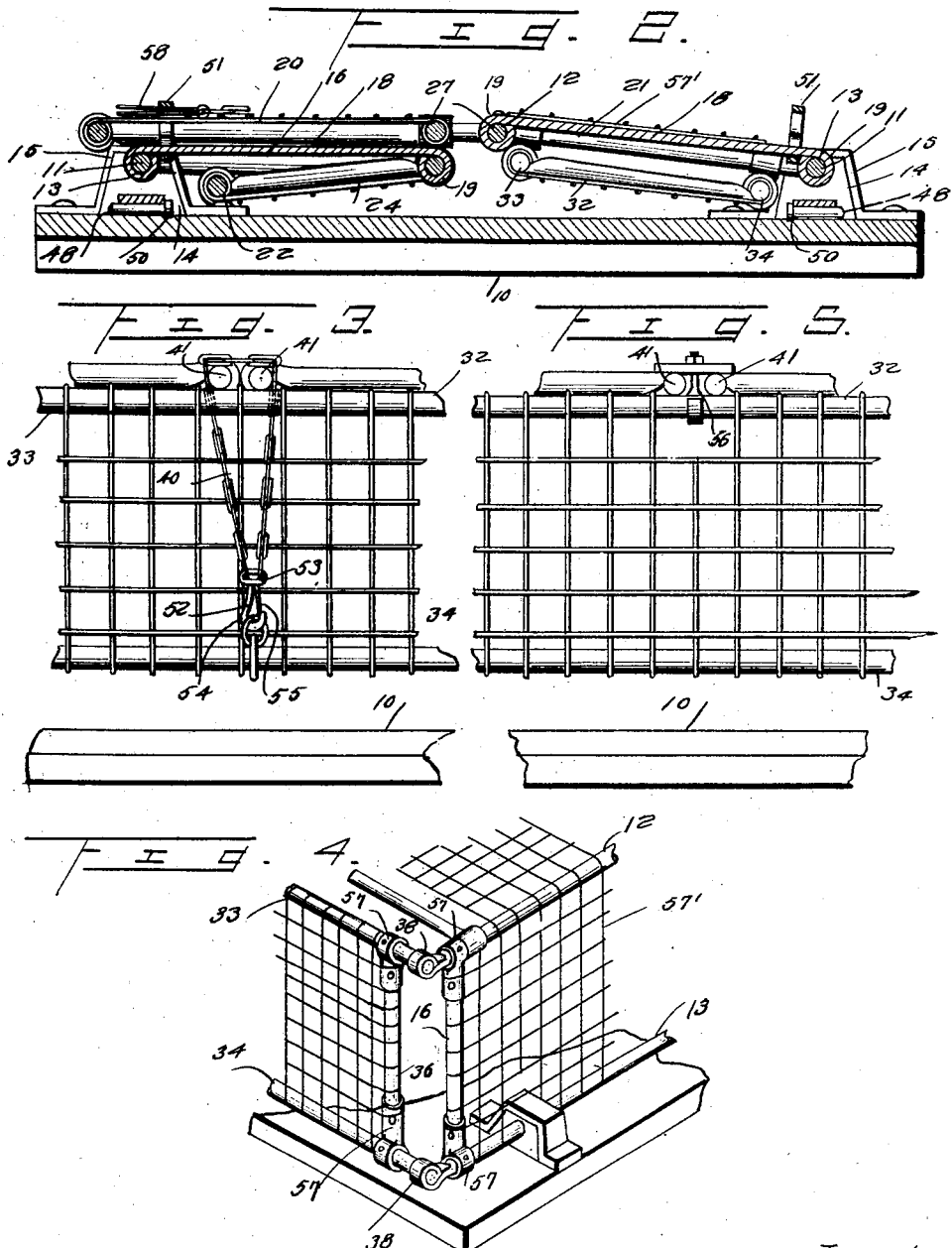

MICHAEL KING, OF ST. LOUIS, MISSOURI.

COLLAPSIBLE CRATE.

1,378,797.  Specification of Letters Patent.  Patented May 17, 1921.

Application filed October 16, 1919. Serial No. 331,056.

*To all whom it may concern:*

Be it known that I, MICHAEL KING, a citizen of the United States, residing at St. Louis, State of Missouri, have invented certain new and useful Improvements in Collapsible Crates; and I do hereby declare the following to be a full, clear, and exact description of the invention, such as will enable others skilled in the art to which it appertains to make and use the same.

My invention relates to improvements in crates or shipping cases of the collapsible type.

An important object of this invention is to provide a shipping crate which may be conveniently and readily collapsed so as to occupy a minimum of space.

A further object of the invention is to provide a collapsible crate having novel means for pivotally connecting the several parts whereby the same are held securely in position when opened.

A further object is to provide a collapsible crate having novel means for locking the top closed.

A further object is to provide a collapsible crate constructed of a plurality of sections each of which may be detached for the purpose of replacement.

A further object is to provide a crate which is simple to collapse, few in parts and cheap to manufacture.

Other objects and advantages will be apparent during the course of the following description.

In the accompanying drawings forming a part of this application and in which like numerals are employed to designate like parts throughout the same.

Figure 1 is a perspective of the crate open,

Fig. 2 is a transverse section through the crate collapsed,

Fig. 3 is a fragmentary end elevation of the crate having a slightly modified form of cover fastening means, Fig. 4 is a fragmentary perspective of the crate showing a slightly modified form of connecting means for the several sections, and Fig. 5 is an end elevation of the crate showing a further modified form of cover fastening means.

In the drawings showing a preferred embodiment of my invention, 10 designates a base upon which side sections or walls 11 are mounted, the same having upper and lower longitudinally extending rods 12 and 13 of which the latter is mounted in bearing members 14 retained in position by keepers 15. The marginal rods 12 and 13 of each side are connected by links 16, having their terminals rolled or crimped around the rods to form sleeves 16'. Rivets 17 may be used to secure the sleeve 16' to the rods 12 and 13. A central vertical bracing bar 18 has its end portions 19 wrapped about the upper and lower rods 12 and 13.

Wide and narrow cover sections 20 and 21 respectively are horizontally hinged to the sides 11, and include longitudinally extending marginal rods 27 connected to the upper marginal rods of the side walls by end rods 24, provided with terminal sleeves 25 engaging the upper rods 12 of the side sections and sleeves 26 receiving the rods 27. Rivets 28 rigidly secure the end rods 24 to the longitudinally extending rods 27. The top section 20 is provided with a longitudinal brace rod 22 having terminal sleeves 23 engaging the links 24 and an opening 29 covered by a hinged section 30. A suitable fastening device 31 may be employed for securing the cover closed.

End walls 32 include upper and lower marginal rods 33 and 34 provided with sleeves 35 engaging the vertical rods 16 of one of the side walls and connected at their free ends by a vertical rod 36 having its terminals rolled about the rods 33 and 34 at points spaced from their ends. Rivets 37 secure the sleeves of the rods 36 to the rods 33 and 34. The end portions of the rods 12 and 13 of the other side section 11 are rolled to provide sockets 38 for receiving the reduced or tapered end portions 39 of the marginal rods 33 and 34 of the end walls.

When closed, the cover sections 20 and 21 may be held in position by flexible elements such as chains 40 extended through the end sections 32 and engaging extensions 41 of the marginal rods 27 of the cover sections 20 and 21. The lower end of the flexible element 40 carries a fastening device 42 having the arms 43 and 44 hingedly connected as indicated at 45, to engage a link 46 and secured by a retaining ring 47 arranged over the arms 43 and 44.

To retain the side sections 11 vertical, I have provided angular locking means 48 having horizontal arms or spindles mounted within caps 49 secured to the base, and provided with heads 50 serving as a means for preventing displacement and swinging arms adapted to be extended through rings 51 carried by the intermediate supports 18.

In the form of my invention illustrated in Fig. 3 I have dispensed with the fastening device 42 and have employed a fastening device 52 consisting of a snap hook 53 secured to a chain and provided with a hook member 54, closed by a leaf spring 55.

In the form of my invention illustrated in Fig. 5 I have dispensed with the chain and the associated fastening element and have employed a slip bolt 56 for securing the top in closed position.

In the form of my invention illustrated in Fig. 4 I have provided clevices 57 on the ends of the rods 16 and 36 for securing the vertical rods to the horizontal rods.

My improved crate is provided with a covering of wire 57' of any desired mesh. As indicated, the wire of the side walls 11 is attached to the vertical rods 16 and the upper and lower rods 12 and 13. The wire of the end walls 32 is attached to the top and bottom rods of the same and the rods 36. One end of the wire of each end wall is attached to the adjacent rod 16 of the side wall by which the end walls are carried. The wire of the top section 20 is attached to the rod 22 and the rod 27. The wire of the section 21 is attached to the rod 27 and the adjacent upper rod 12. When it is desired to collapse the receptacle, one of the side walls 11 is folded inwardly to a horizontal position and the connected top section 21 is also caused to assume a horizontal position. The end walls 32 secured to the opposite side walls 11 are folded inwardly and the latter are subsequently folded over the top and side sections already folded. The top section 20 is folded to a horizontal position with the adjacent or connected section 11. A locking pin 58 serves to secure the sections closed.

While I have shown and described the preferred embodiment of my invention, it is understood that such minor changes in arrangement and construction of parts such as employing any desired type of fastening means for the cover and other sections may be employed as will remain within the spirit of the invention and the scope of the appended claims.

It should be noted that the longitudinal brace rod 22 connecting the terminal elements 24 of that cover section which is carried by the side wall to which the end walls are connected or upon which said end walls are mounted, provides a space adjacent to the marginal upper rod 12 of the side wall to accommodate the end wall frames when the latter are in their folded position.

Having thus described my invention, what I claim is:—

1. A collapsible crate having a base, side walls horizontally hinged to the base and having frames composed of upper and lower marginal rods connected by vertical links, vertically hinged end walls carried by the extremities of one of the side walls, and complemental top sections carried respectively by the side walls and consisting of inner marginal rods connected by links to the upper marginal rods of said side walls.

2. A collapsible crate having a base, side walls horizontally hinged to the base and having frames composed of upper and lower marginal rods connected by vertical links, vertically hinged end walls carried by the extremities of one of the side walls, and complemental top sections carried respectively by the side walls, and consisting of inner marginal rods connected by links to the upper marginal rods of said side walls, that top section which is carried by the side wall upon which the end walls are mounted having an auxiliary longitudinal brace rod inset from the plane of the side wall for supporting the outer edge of the filler.

3. A collapsible crate having a base, side walls horizontally hinged to the base and having frames composed of upper and lower marginal rods connected by vertical links, vertically hinged end walls carried by the extremities of one of the side walls and having a frame consisting of upper and lower marginal rods mounted at one end upon the end link of the side wall and connected at their free ends by a vertical link, and complemental top sections carried respectively by the side walls.

4. A collapsible crate having a base, side walls horizontally hinged to the base and having frames composed of upper and lower marginal rods connected by vertical links, vertically hinged end walls carried by the extremities of one of the side walls, and complemental top sections carried respectively by the side walls and consisting of inner marginal rods connected by links to the upper marginal rods of said side walls, the other side wall having its marginal upper and lower rods provided with terminal sockets for the reception of the extremities of the marginal rods of the end walls.

5. A collapsible crate having a base, side walls horizontally hinged to the base and having frames composed of upper and lower marginal rods connected by vertical links, vertically hinged end walls carried by the extremities of one of the side walls, and complemental top sections carried respectively by the side walls and consisting of inner marginal rods connected by links to the upper marginal rods of said side walls, the other side wall having its marginal upper and lower rods provided with terminal means for interlocking engagement with the free ends of the end walls.

In testimony whereof I affix my signature in presence of two witnesses.

MICHAEL KING.

Witnesses:
 LENORA PERRY,
 BERTHA M. PERRY.